Dec. 7, 1965   W. F. REMINGTON ETAL   3,222,104
CHILD'S CONVERTIBLE CAR AND TABLE SEAT
Filed Oct. 30, 1964   2 Sheets-Sheet 1
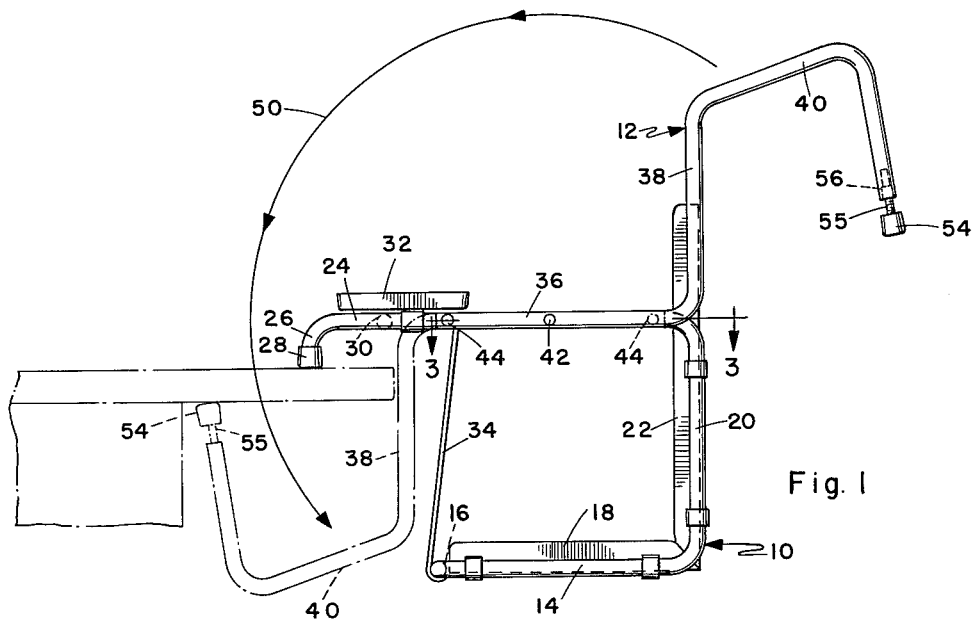
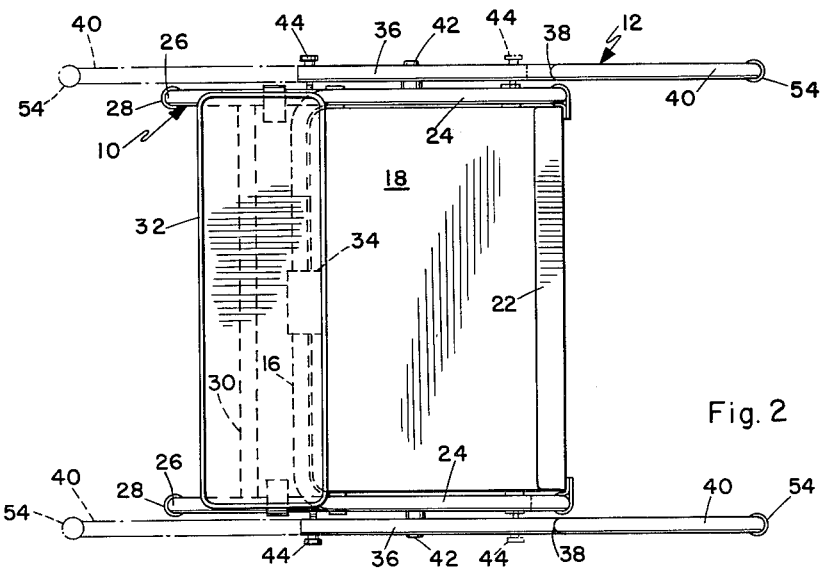
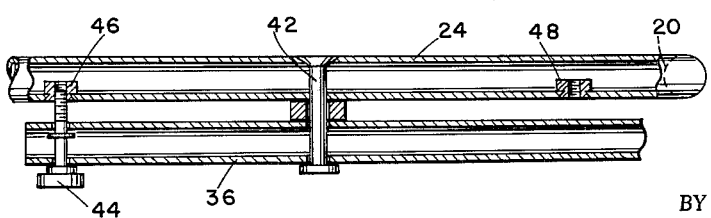
*INVENTORS*
WILLIAM F. REMINGTON
REMINGTON R. JACKSON
BY Knox & Knox

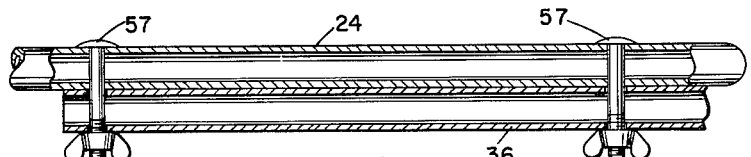
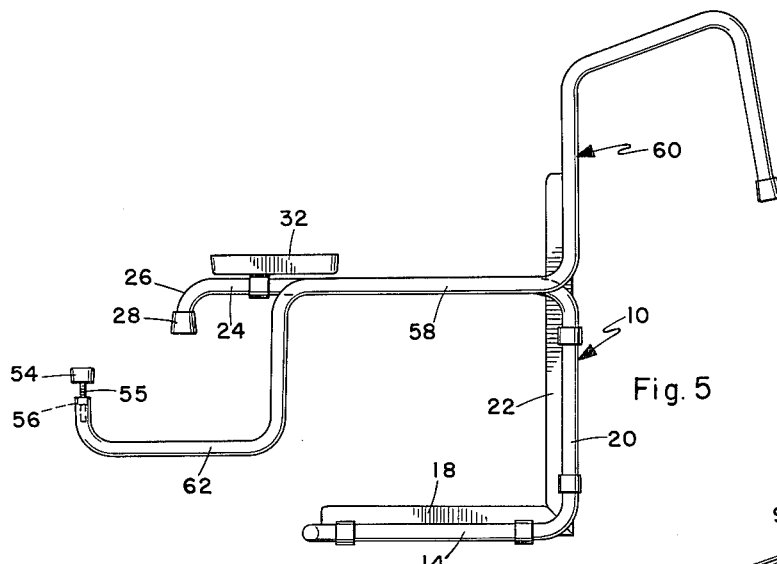
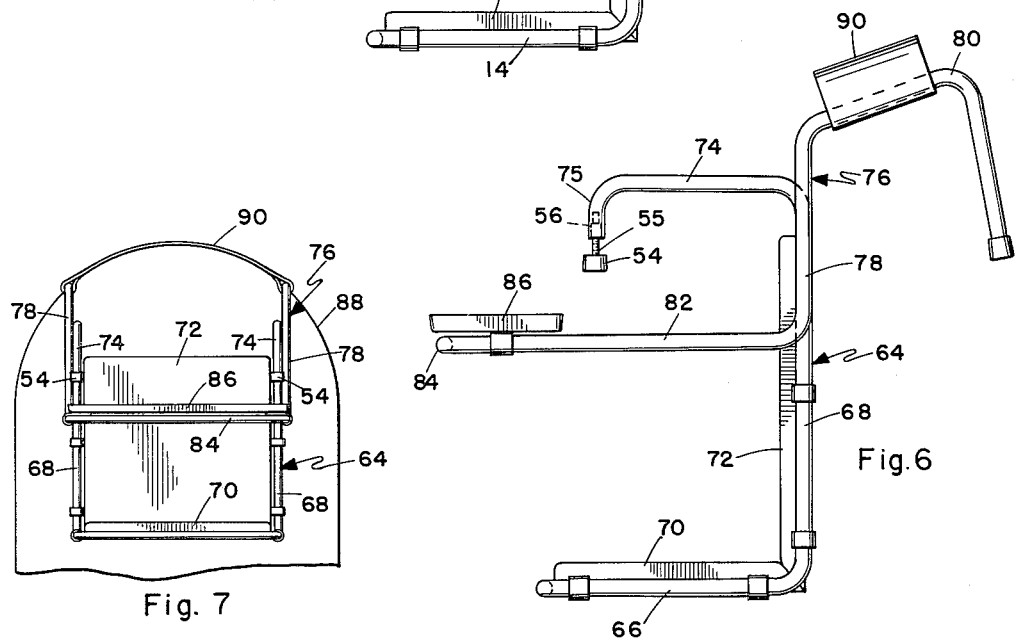
INVENTORS
WILLIAM F. REMINGTON
REMINGTON R. JACKSON
BY
Knox & Knox

United States Patent Office 3,222,104
Patented Dec. 7, 1965

3,222,104
CHILD'S CONVERTIBLE CAR AND TABLE SEAT
William F. Remington, 6653 Avenida Manana, La Jolla, Calif., and Remington R. Jackson, P.O. Box 104, Del Mar, Calif.
Filed Oct. 30, 1964, Ser. No. 407,642
3 Claims. (Cl. 297—134)

This invention relates generally to a child's seat and more particularly to one that can be readily converted for use in either an automobile or secured to a table for use as a high chair.

It is accordingly the primary object of this invention to provide an improved child's seat which may be used with equal facility as a car seat suspended from the back of the conventional automobile seat or as a high chair mounted on a table top.

It is a further object of this invention to provide an improved child's seat that is easily adjusted between two positions of use.

Finally it is an object to provide a child's seat of the aforementioned character which is simple and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 1 is a side view of the preferred modification;
FIGURE 2 is a top plan view of FIGURE 1;
FIGURE 3 is an enlarged section on the line 3—3 of FIGURE 1;
FIGURE 4 is a view similar to FIGURE 3 but without the pivotal hinge structure;
FIGURE 5 is a side view of a modified seat;
FIGURE 6 is a side view of a further modification; and
FIGURE 7 is a front view on a reduced scale of FIGURE 6 showing the mounting of the improved seat on one form of bucket-type automobile seat.

With particular reference to FIGURES 1, 2 and 3 which illustrate the preferred form of our invention, the basic structure of our improved child's seat consists of two main components, a seat frame 10 and a hanger frame 12, suitably joined together. Both of these frames are shown as being constructed of round metallic bar stock but it is understood that any other suitable structural material may be substituted therefor. The seat frame 10 consists of horizontally extending parallel side members 14 connected by a front member 16 to form a support for a seat portion 18. The rear ends of the side members 14 are bent upwardly to form vertically extending parallel side members 20 between which is suitably mounted a back support panel 22. The upper ends of side members 20 are bent forwardly to form horizontally extending arm members 24 which are generally parallel to and spaced apart substantially the same distance as the side members 14. Arm members 24 extend a substantial distance forward of front member 16 and terminate in a downwardly curved portion 26 which may, if desired, be covered with a plastic or rubber cap 28. To provide adequate strength and bracing for arms 24, they may be connected by a strut 30 suitably secured to each arm. A tray member 32 of generally conventional form may also be mounted on arms 24 in accordance with practice well known in the art and this tray may be connected to front member 16 by a strap 34.

The hanger frame 12 consists of two similar members mounted on opposite sides of the seat frame. Each member includes a horizontally extending portion 36 spaced slightly outwardly from the arm 24, and a vertically extending portion 38 which terminates in a downwardly opening hook-like portion 40. The members 36 are pivotally mounted to the members 24 by means of the pivot pins 42, and a locking pin 44 of any suitable construction is mounted on arm 36 to selectively engage recess 46 or recess 48 on arm 24 to secure the hanger frame in one of two different positions.

With the seat frame and hanger frame locked in the relative positions shown in solid lines in FIGURE 1, the structure may be suspended from the back of an automobile seat as shown, for example, in FIGURE 7. To convert the seat for use as a high chair supported from a table top, it is only necessary to release the locking pin 44 from the recess 46 and swing the hanger frame 12 about the pivot pin 42 through an arc of 180° as indicated by the arrows 50 to the position shown in broken lines. Locking pin 44 may then be engaged in recess 48 and the seat moved to a position where the table top 52 is located between cap 28 and the end cap 54 of hook-like portion 40. This provides a rigid mounting for the seat and it will now function in the manner of the conventional children's high chair. To provide means for adjustment to fit table tops or similar supports of different thicknesses, the end cap 54 is mounted on a screw 55 which is adjustable in a nut 56 fixed in the end of hook-like portion 40. The vertical separation of caps 28 and 54 can then be adjusted so that the seat is not tilted forwardly to put the child in an uncomfortable position.

In FIGURE 4 we have shown a modification of the securing means for the arms 24 and 46. In place of the pivot pin 42 a pair of spaced detachable bolts 57 are used. In this form the hanger frame may be completely detached from the seat frame which may be desirable for purposes of storage or shipment.

In FIGURE 5 we have shown a modification in which the seat frame and hanger frame are permanently secured together. In this form the seat frame 10 is identical to that shown in FIGURE 1. The arms 58 of the modified seat frame, indicated generally by the reference numeral 60, are extended forwardly and bent downwardly and then upwardly to form an upwardly opening generally U-shaped portion 62, the end of which is fitted with an adjustable cap 54, as described above. It will be evident that this form of our seat structure can be supported from a table top in the same manner as that shown in FIGURE 1.

In FIGURES 6 and 7 we have shown a further modification of our improved seat structure. In this form the seat frame, indicated generally by the reference numeral 64, is provided with the usual horizontally extending members 66 and vertically extending members 68 to which are secured respectively the seat 70 and back 72. The upper end of each member 68 is turned forwardly to provide an arm 74, as shown in FIGURE 6, each arm terminating in a downwardly extending end 75 which may, if desired, be fitted with an adjustable cap 54.

The hanger frame 76 of this modification includes intermediate, vertically extending portions 78 which are rigidly secured to the outer sides of members 68 and terminate at their upper ends in hook-like portions 80 which are similar to the hook-like portions 40 of FIGURE 1. The lower end of portions 78 extend horizontally to form parallel arms 82, the outer ends of which are joined by a brace 84. The usual tray 86 may, if desired, be mounted on arms 82.

At the present time the so-called bucket seat is becoming popular in automobile construction. Several types are used and in one form the top of the back is curved as shown at 88 in FIGURE 7. We have found it desirable to center the child's seat to prevent it from slipping from one side or the other by providing a strap 90 extending between the top portions only of the hook-like portions 80. This strap arches upwardly over the top of such a seat back and by engaging the same provides sufficient friction to prevent slippage when the child's seat is mounted on the back portion of a bucket seat. It is to be understood that this strap member 90 may be used with the other forms of the invention disclosed herein.

When the seat is used in a vehicle, the child is well protected in the event of a collision since the tray holds the child in place and the structural frame surrounds the child. In the configurations illustrated in FIGURES 1–5 in particular, the portions of the frame structure extending forward of the tray will provide extra protection, even if the vehicle seat back on which the child's seat is mounted should swing forward, since these extensions will strike an obstruction before the child.

It is understood that minor variation from the form of the invention disclosed herein may be made without departure from the spirit and scope of the invention, and that the specification and drawings are to be considered as merely illustrative rather than limiting.

We claim:

1. In a child's convertible car and table seat, the combination of:
   a seat frame having a seat portion, back portion and arms extending forwardly from said back portion;
   first means extending forwardly of said arms for engaging the top horizontal surface of a table;
   a hanger frame including hook-like elements and second means adjustably mounting said hanger frame on said arms said hanger frame being shiftable from a first position in which said hook-like elements are disposed to engage the back of an automobile seat, to a second position in which said hook-like elements are disposed to engage the bottom surface of the top of a table and spaced forwardly of said first means.

2. The structure of claim 1 in which said seat frame and hanger frame are pivotally connected.

3. The combination of claim 1 further including a narrow strap connecting the said hook-like portions and adapted to arch over and engage the top of a curved seat back such as the back of an automobile bucket seat.

References Cited by the Examiner

UNITED STATES PATENTS

| | | | |
|---|---|---|---|
| Re. 23,339 | 2/1951 | Ducey | 297—174 |
| 2,707,987 | 5/1955 | Gibson | 297—174 |
| 3,052,500 | 9/1962 | Hyde | 297—174 X |
| 3,059,965 | 10/1962 | Fornetti | 297—174 |
| 3,115,364 | 12/1963 | Berlin | 297—130 |
| 3,126,226 | 3/1964 | Johnson | 297—174 |
| 3,132,895 | 5/1964 | Pollington | 297—134 |
| 3,133,760 | 5/1964 | Robinson | 297—174 |
| 3,133,761 | 5/1964 | Ross | 297—174 |
| 3,144,273 | 8/1964 | P'Simer et al. | 297—254 |
| 3,155,425 | 11/1964 | Chreist | 297—254 X |

FOREIGN PATENTS 244,697  8/1962  Australia.

FRANK B. SHERRY, Primary Examiner.

J. T. McCALL, Assistant Examiner.